(12) United States Patent
Obertegger et al.

(10) Patent No.: US 8,141,981 B2
(45) Date of Patent: Mar. 27, 2012

(54) INKJET PRINTING DEVICE AND METHOD FOR PRINTING MULTI-COLOURED IMAGES

(75) Inventors: Franz Obertegger, Brixen (IT); Mario Gandini, Brixen (IT); Thomas Stoll, Gsies (IT); Andrä Niederbacher, Bruneck (IT)

(73) Assignee: Durst Phototechnik - A.G., Brixen (IT)

( * ) Notice: Subject to any disclaimer, the term of this patent is extended or adjusted under 35 U.S.C. 154(b) by 822 days.

(21) Appl. No.: 11/883,954

(22) PCT Filed: Feb. 1, 2006

(86) PCT No.: PCT/EP2006/000865
§ 371 (c)(1),
(2), (4) Date: Oct. 21, 2008

(87) PCT Pub. No.: WO2006/084614
PCT Pub. Date: Aug. 17, 2006

(65) Prior Publication Data
US 2009/0213157 A1    Aug. 27, 2009

(30) Foreign Application Priority Data

Feb. 8, 2005  (AT) ................................. A 203/2005
Aug. 10, 2005  (AT) ............................... A 1342/2005

(51) Int. Cl.
*B41J 2/165* (2006.01)
(52) U.S. Cl. .................. 347/36; 347/89; 347/90
(58) Field of Classification Search ............. 347/21–22, 347/28, 29, 30–36, 37, 40, 84–85, 89
See application file for complete search history.

(56) References Cited

U.S. PATENT DOCUMENTS

| 3,177,568 A | 4/1965 | Schweiker |
| 4,488,830 A | 12/1984 | Ruenzi et al. |
| 4,847,638 A | 7/1989 | Moriyama et al. |

(Continued)

FOREIGN PATENT DOCUMENTS

AT    A 2099/2003    10/2005
(Continued)

OTHER PUBLICATIONS

International Search Report, Sep. 2006.

*Primary Examiner* — Thinh Nguyen
(74) *Attorney, Agent, or Firm* — Collard & Roe, P.C.

(57) ABSTRACT

The invention relates to an ink jet printing device (1) for printing multicolored images, with an essentially horizontally extending conveyor mechanism (2) for moving items to be printed (3) lying on it in a forward feed direction (4), and with a print head arrangement (5) disposed above the conveyor mechanism (2) which is disposed stationary relative to the conveyor mechanism (2) during the printing process. The print head arrangement (5) is made up of several print heads (6) each with several nozzles disposed in a nozzle row (26), and the nozzle rows (22) have a printing range width (24) as measured perpendicular to the forward feed direction (4) which forms a total printing range width (27) of the print head arrangement (5) corresponding to the number of print heads (6). The print head arrangement (5) is disposed so that it can be displaced vertically on a guide (10) and a nozzle rinsing device (14) is provided which can be positioned underneath the print head arrangement (5) as and when necessary.

16 Claims, 10 Drawing Sheets

U.S. PATENT DOCUMENTS

Figure 1:
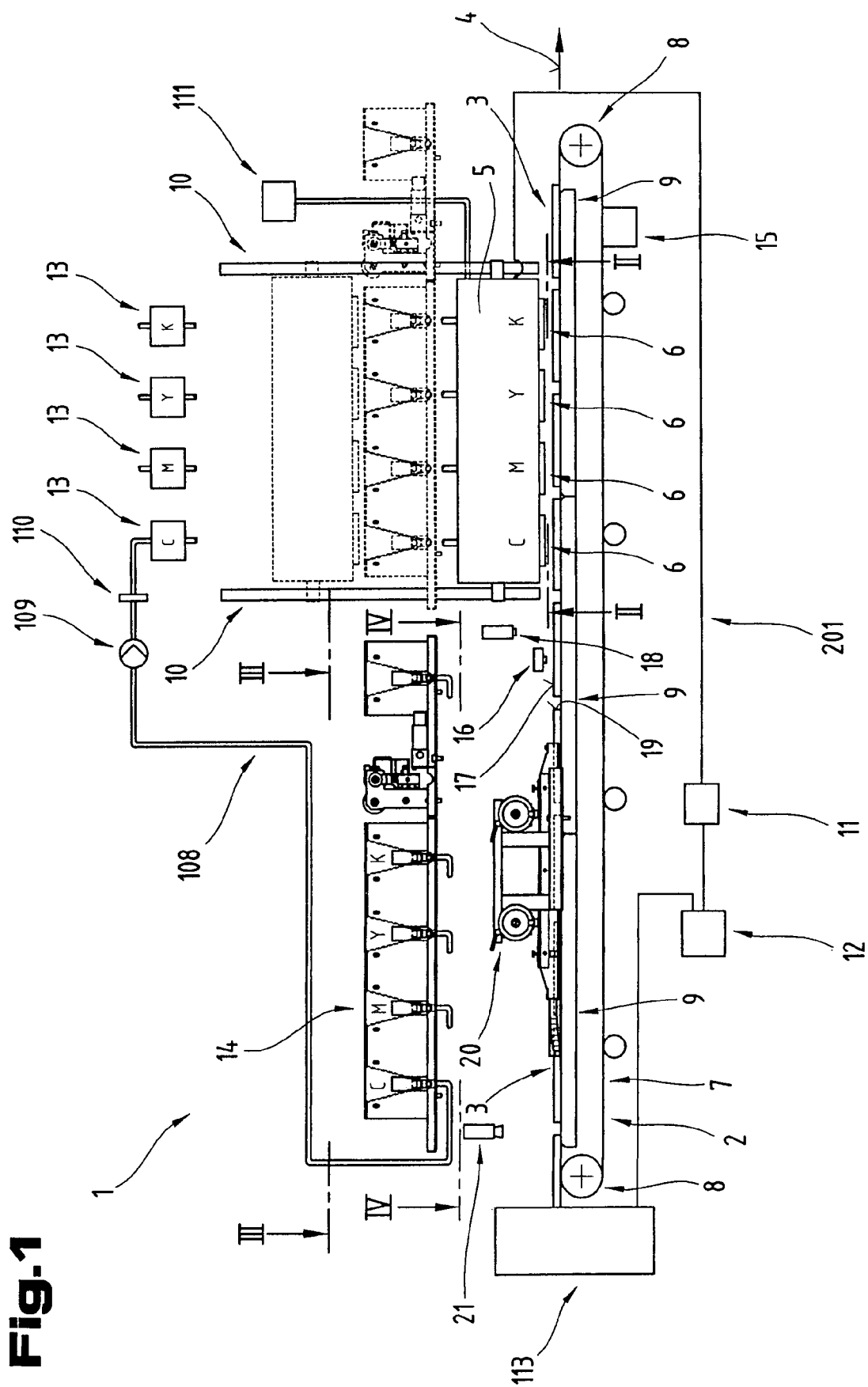

| | | | |
|---|---|---|---|
| 5,270,738 A | 12/1993 | Takahashi et al. | |
| 5,786,829 A | 7/1998 | Pasciak, Jr. et al. | |
| 5,790,146 A | 8/1998 | Anderson et al. | |
| 6,155,669 A | 12/2000 | Donahue et al. | |
| 6,305,856 B1 | 10/2001 | Miyazaki | |
| 6,406,122 B1 * | 6/2002 | Sharma et al. | 347/28 |
| 6,478,402 B1 | 11/2002 | Greive | |
| 6,499,841 B1 | 12/2002 | Uchida et al. | |
| 6,578,945 B2 * | 6/2003 | Hashi et al. | 347/22 |
| 7,648,224 B2 * | 1/2010 | Sasa et al. | 347/36 |
| 2002/0044168 A1 | 4/2002 | Hashi et al. | |
| 2003/0099494 A1 | 5/2003 | Downing | |
| 2004/0075702 A1 | 4/2004 | Waller | |
| 2004/0085428 A1 | 5/2004 | Silverbrook | |
| 2004/0109047 A1 | 6/2004 | Tobita et al. | |
| 2004/0119781 A1 | 6/2004 | Szumla | |
| 2004/0239710 A1 | 12/2004 | Silverbrook et al. | |

FOREIGN PATENT DOCUMENTS

| | | |
|---|---|---|
| DE | 199 29 320 A1 | 12/2000 |
| EP | 0445526 | 9/1991 |
| EP | 0 461 759 | 12/1991 |
| EP | 0 461 759 A | 12/1991 |
| EP | 0 558 219 A | 9/1993 |
| EP | 0 613 779 A | 9/1994 |
| EP | 0 671 274 A | 9/1995 |
| EP | 1 038 689 B1 | 9/2000 |
| EP | 1 070 592 A | 1/2001 |
| EP | 1 142 717 A | 10/2001 |
| EP | 1 388 422 A | 2/2004 |
| EP | 1 393 912 A | 3/2004 |
| EP | 1 442 892 A | 8/2004 |

* cited by examiner

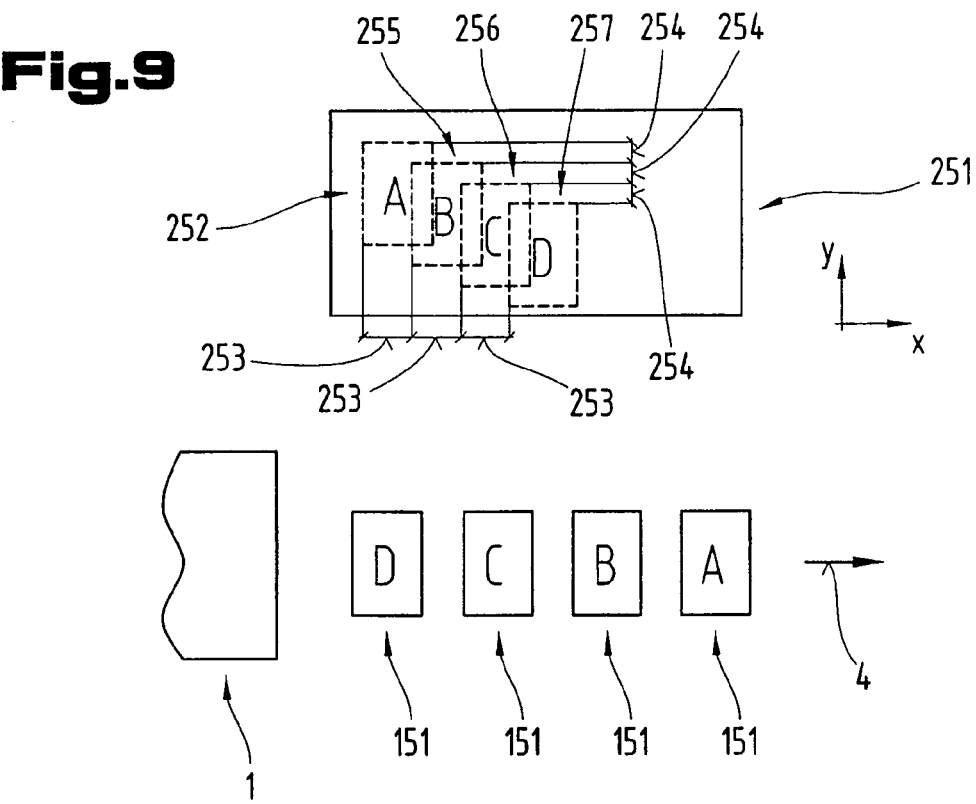
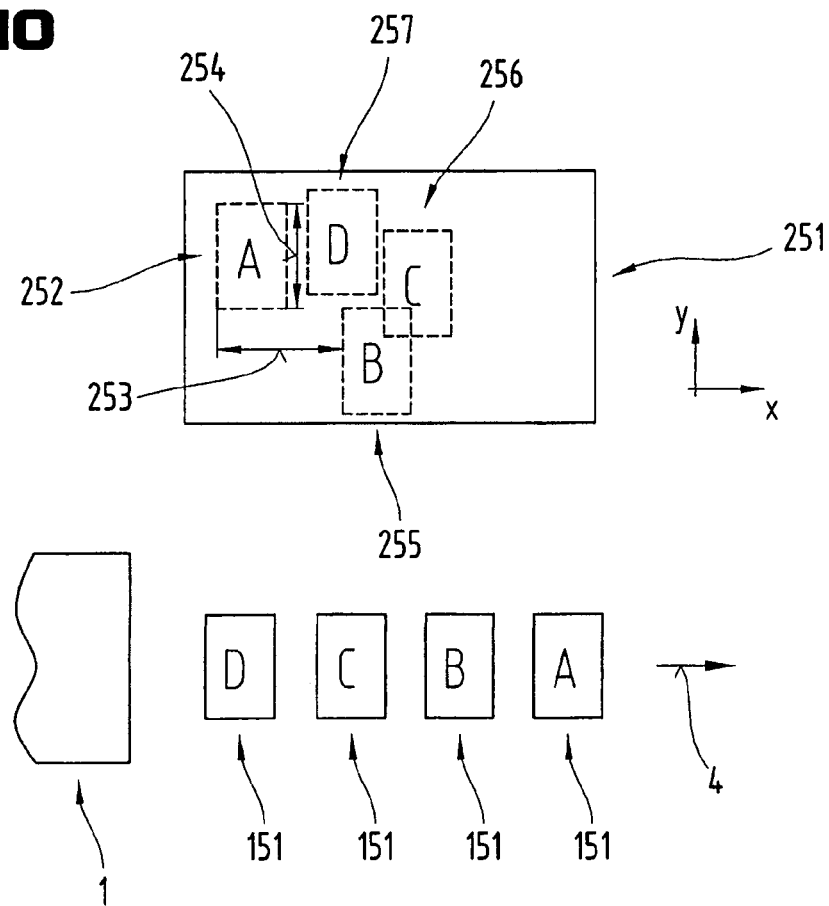

INKJET PRINTING DEVICE AND METHOD FOR PRINTING MULTI-COLOURED IMAGES

CROSS REFERENCE TO RELATED APPLICATIONS

Applicants claim priority under 35 U.S.C. §119 of Austrian Application No. A 203/2005 filed Feb. 8, 2005 and Austrian Application No. A 1342/2005 filed Aug. 10, 2005. Applicants also claim priority under 35 U.S.C. §365 of PCT/EP2006/000865 filed Feb. 1, 2006. The international application under PCT article 21(2) was not published in English.

The invention relates to an ink jet printing device and a method of printing multicoloured images.

Ink jet printing devices for printing multicoloured images are already known and have print head arrangements made up of several print heads which are grouped to form a total printing range width and which are disposed in a stationary arrangement relative to a transport mechanism to which parts to be printed are conveyed during the printing process. Such a printing device is described in document EP 1 038 689 B1, for example.

In the case of an ink jet printer disclosed in document US 2004/0085428 A1, it has a print head with a single row of nozzle orifices spanning the entire printing range width. Another known aspect of this ink jet printer is the fact that an image data circuit for activating the print heads is provided, as well as a buffer circuit, and the buffer circuit has several part-buffers, each for one of the individual colours.

Ink jet printing devices are required to be highly reliable and not susceptible faults, especially in applications where such ink jet printing devices are used in conjunction with industrial manufacturing processes and in industrial production plants where these ink jet printing devices constitute part of a continuous production process.

The objective of this invention is to improve an ink jet printing device and a method of printing multicoloured images so that the requisite maintenance needed can be reduced. Another objective of the invention is to propose an ink jet printing device which permits use in industrial production plants with a high degree of flexibility and a high printing speed.

This objective is achieved by an ink jet printing device according to one aspect of the invention. The resultant advantage is that the time required for cleaning the print heads of the print head arrangement can be kept very low.

Also of advantage are the embodiments of the ink jet printing device discussed below.

The objective of the invention is also independently achieved by means of the ink jet printing device according to another aspect of the invention. The resultant advantage is that sufficient image data is always held ready in the image data circuit of the print head arrangement so that even brief delays in transmitting the image data will not lead to stoppages of the printing process.

Other advantageous embodiments of the ink jet printing device are discussed below.

Also proposed is an independent solution based on the method according to another aspect of the invention. The resultant advantage is that the data processing system is made easier for the control system to control in order to run the method.

Other advantageous features of the method are discussed below.

In order to provide a clearer understanding of the invention, it will be described in more detail below with reference to the appended drawings.

Figure 2:
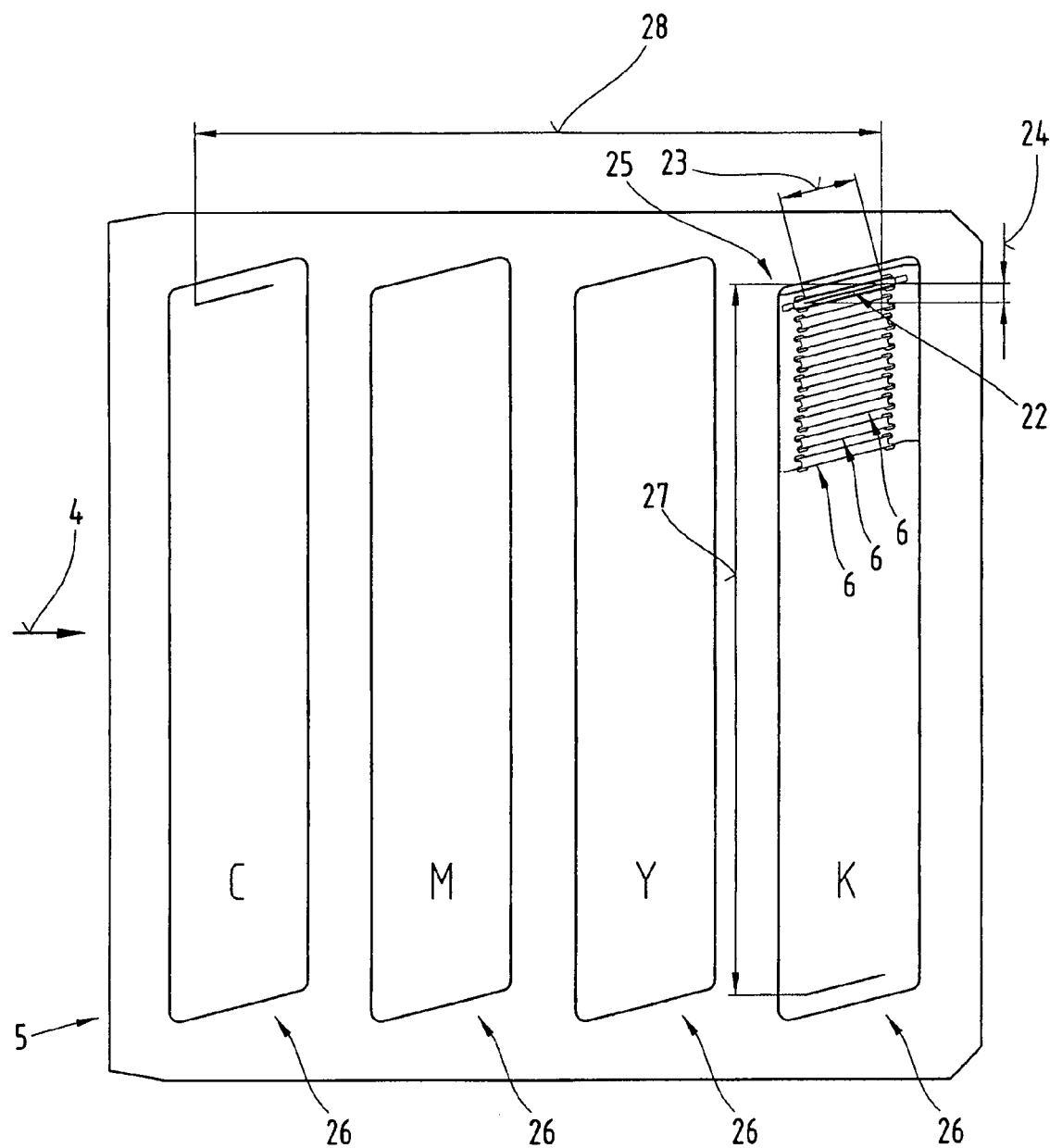
Figure 3:
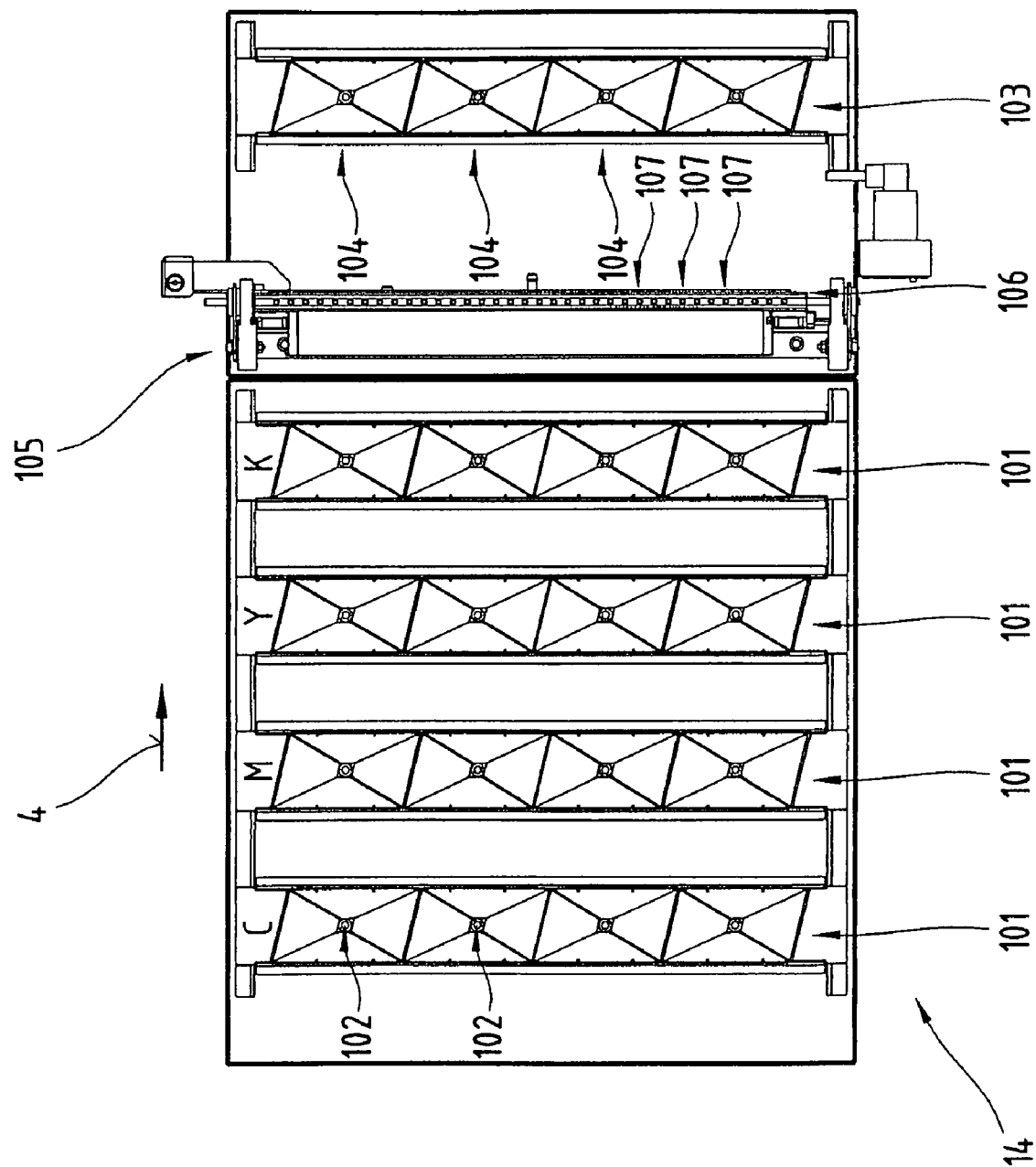
Figure 4:
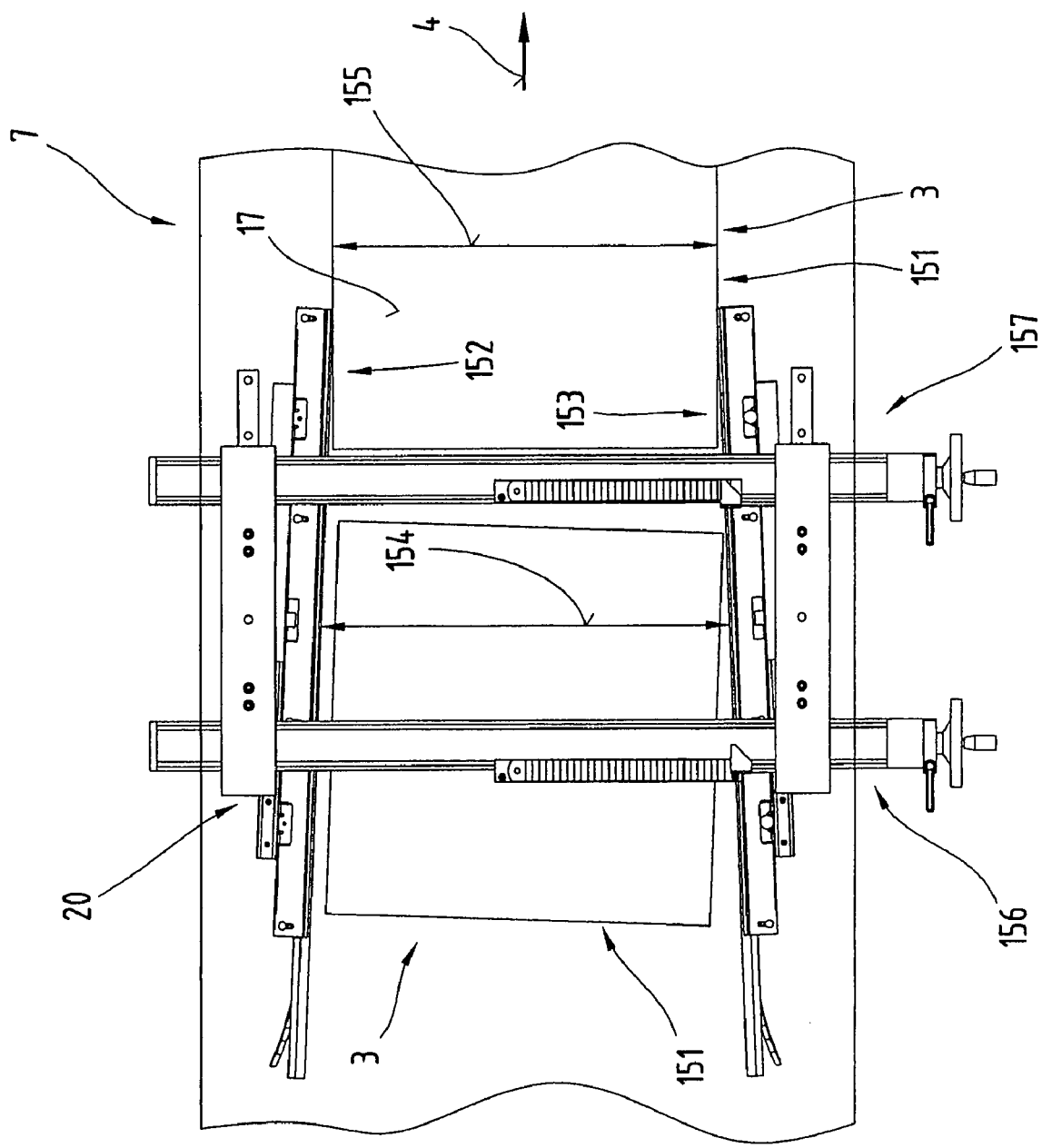
Figure 5:
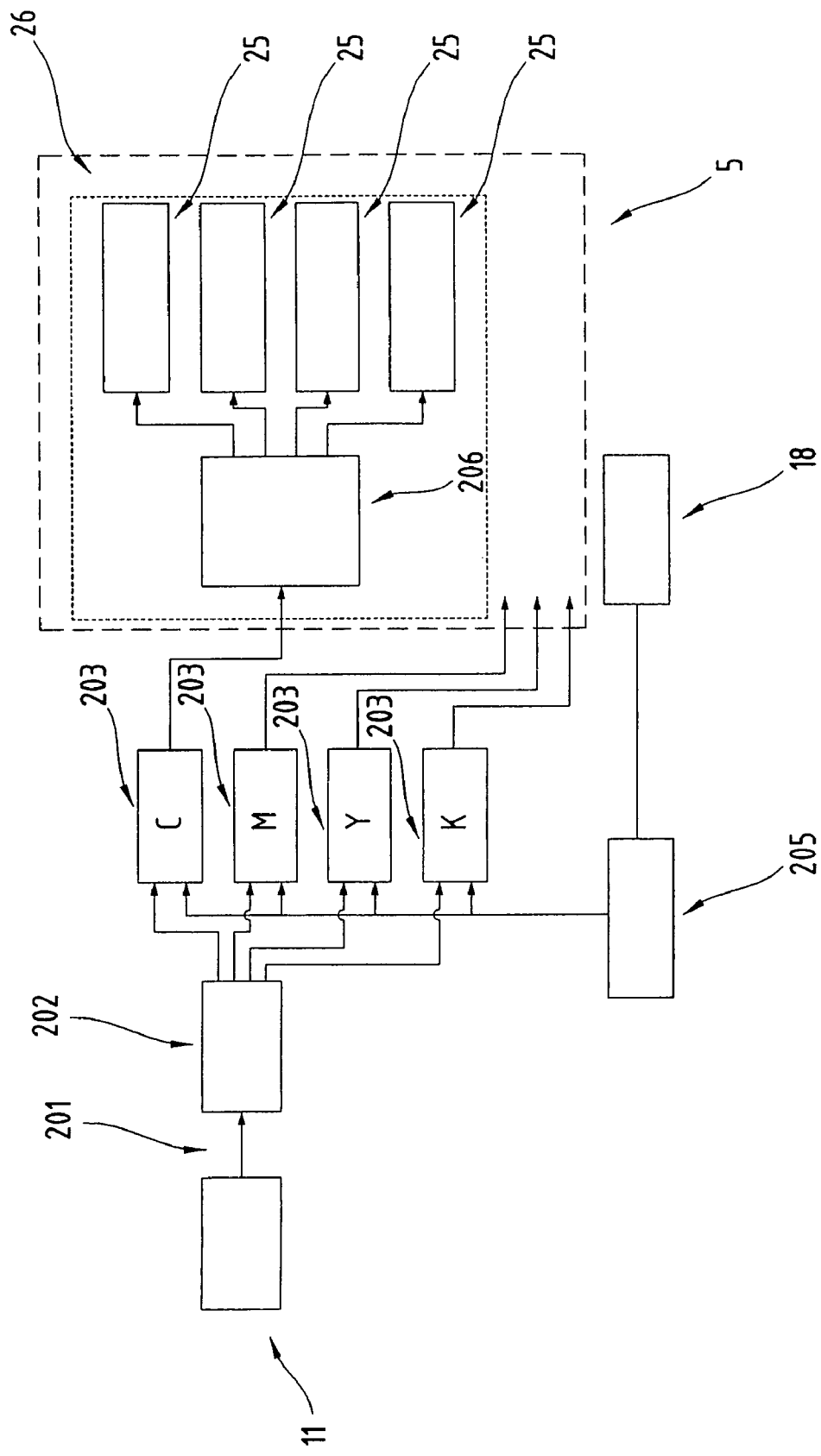
Figure 6:
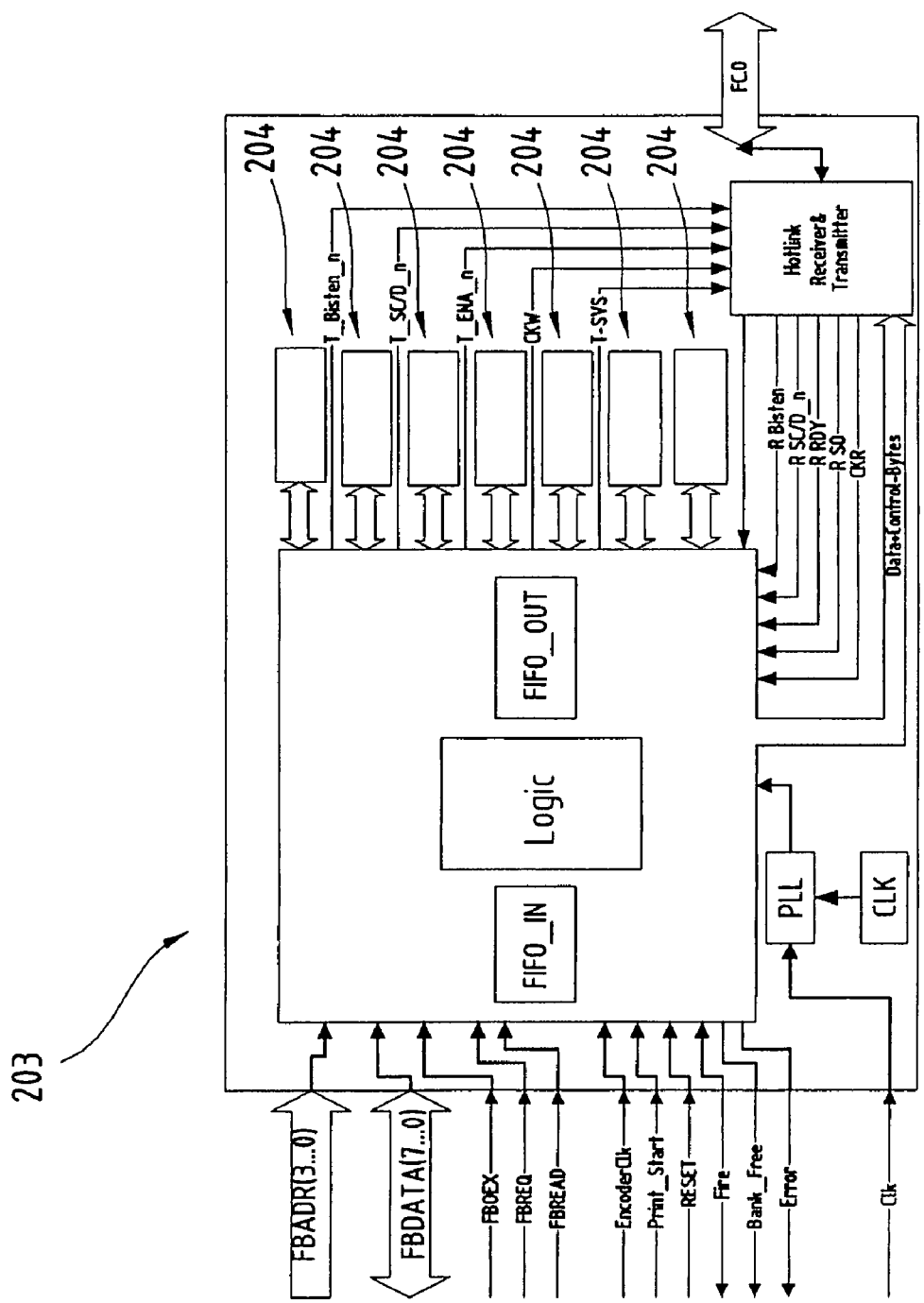
Figure 7:
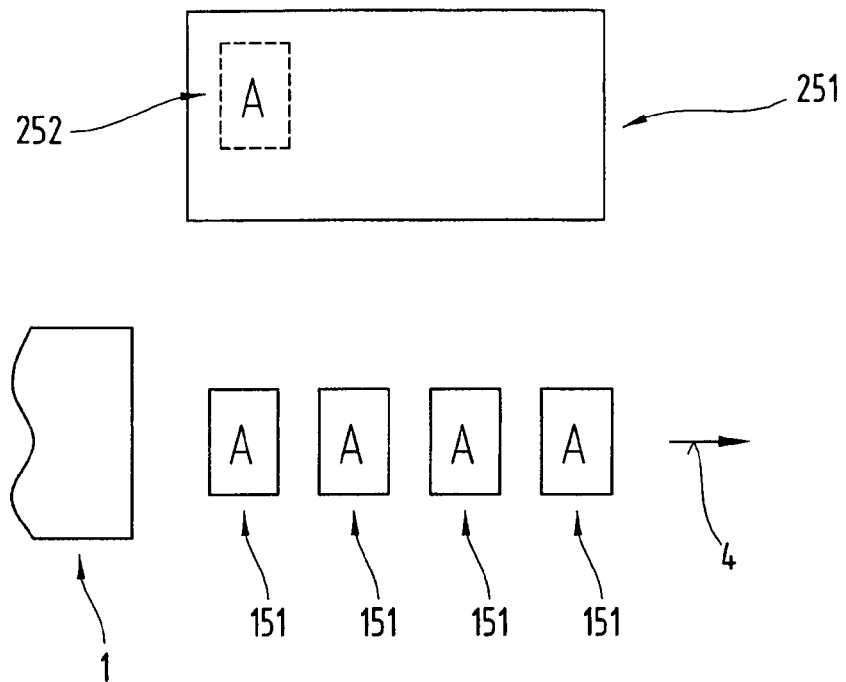
Figure 8:
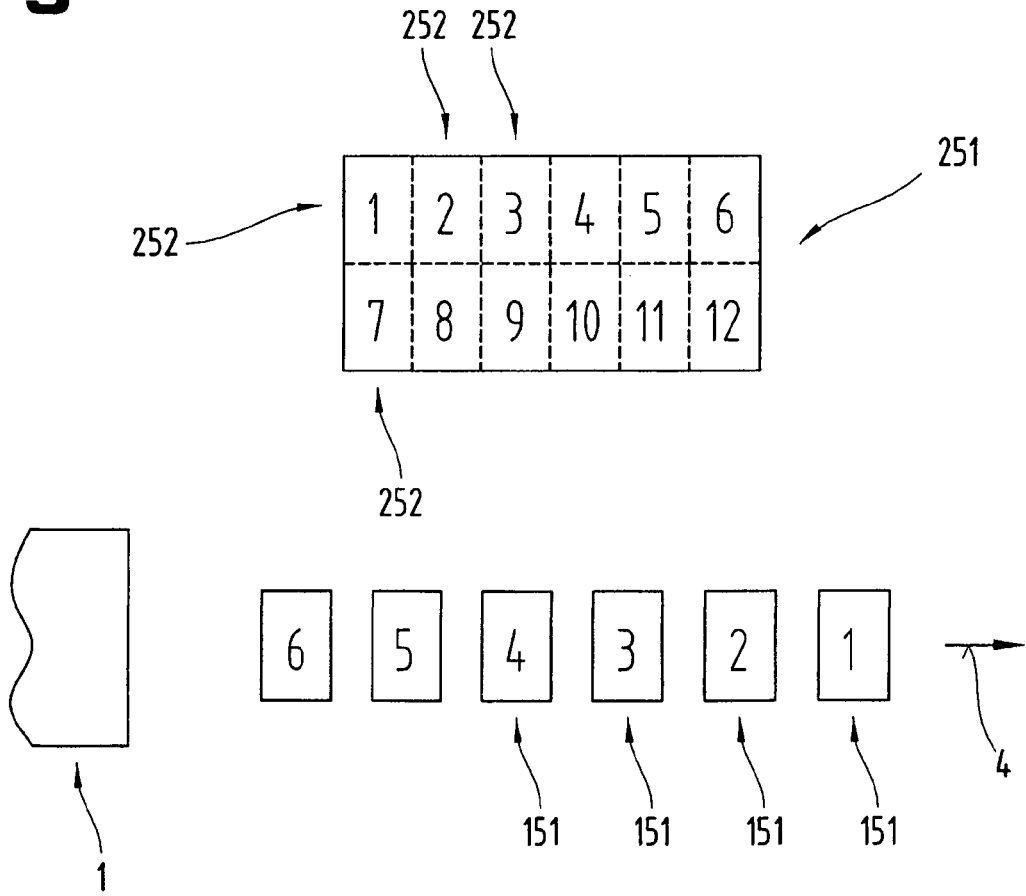
Figure 11:
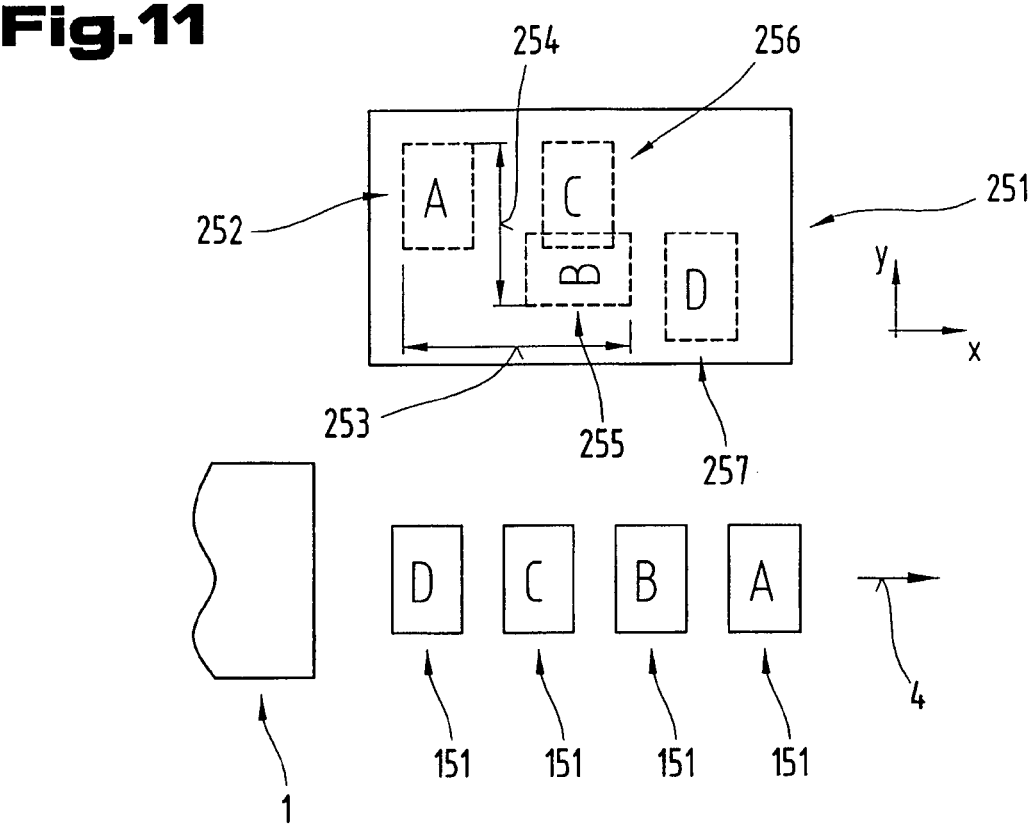
Figure 12:
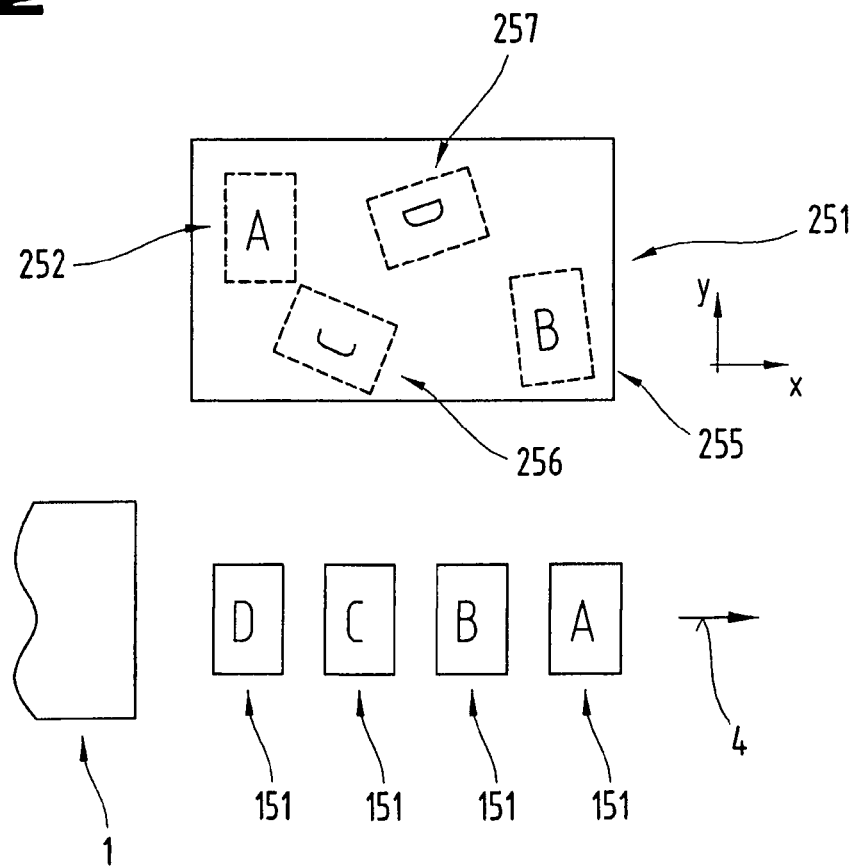
Figure 13:
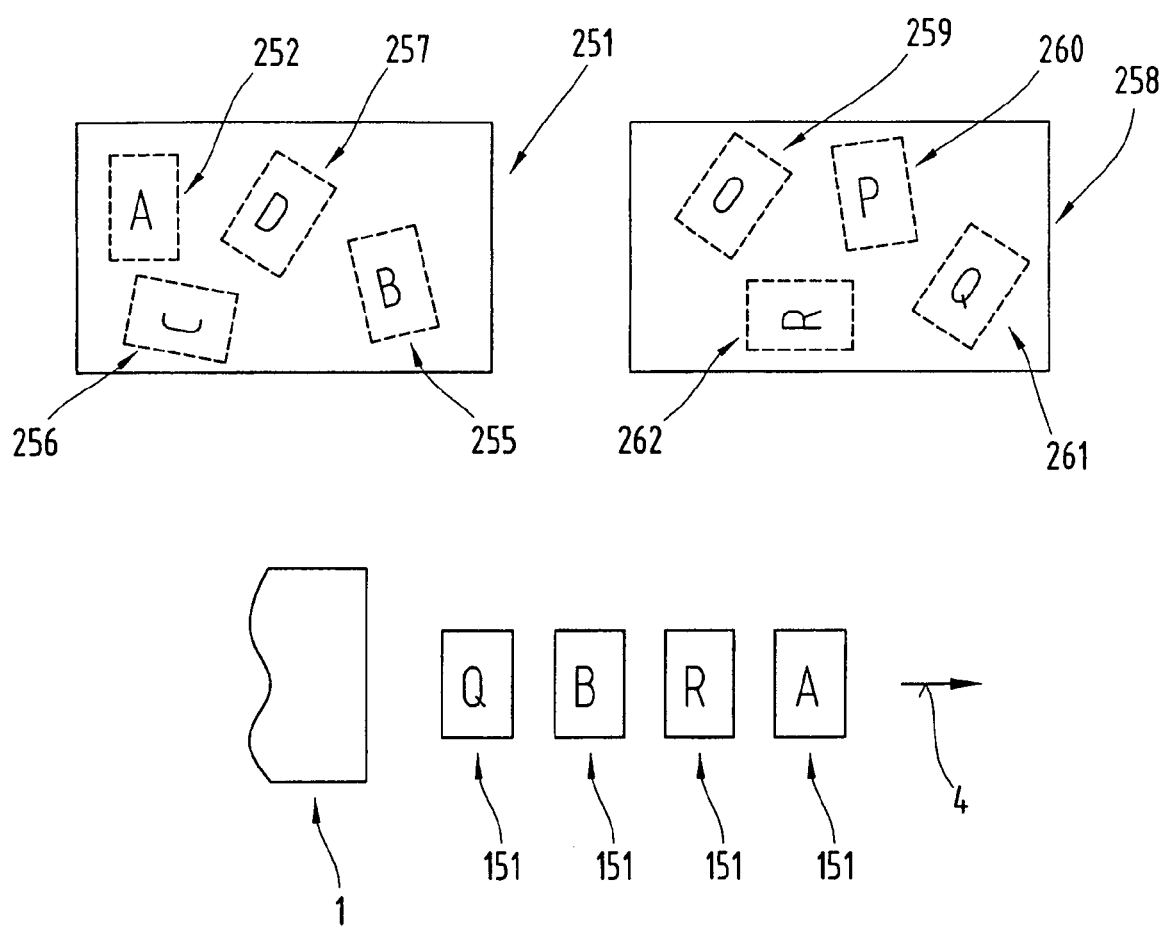

The schematic, simplified diagrams illustrate the following:

FIG. 1 an overall view of the ink jet printing device;

FIG. 2 the bottom face of the print head arrangement illustrated in FIG. 1 with the print heads disposed in it;

FIG. 3 a plan view of the nozzle rinsing mechanism illustrated in FIG. 1;

FIG. 4 a plan view showing a detail of the ink jet printing device illustrated in FIG. 1 with the mechanism for correcting the position of the items to be printed;

FIG. 5 a block diagram showing the data flow between the image computer and the print head arrangement;

FIG. 6 a buffer circuit of the print head arrangement illustrated in FIG. 5 for temporarily storing image data for a coloured ink to be printed;

FIG. 7 a system of selecting the image details from a image master for printing tiles;

FIG. 8 a system of selecting an ordered sequence of different image details from an image master for printing tiles;

FIG. 9 a system for making another ordered selection of image details from an image master;

FIG. 10 a system for randomly selecting image details from an image master,

FIG. 11 a system for making another random selection of image details from an image master with a 90° of the image details;

FIG. 12 a system for making another random selection of image details from an image master with a random rotation of the image details;

FIG. 13 an operating mode of the ink jet printing device using several different image masters.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 provides an overall view of the ink jet printing device 1 providing a schematic and simplified illustration of the individual parts.

The ink jet printing device 1 comprises an essentially horizontally disposed conveyor mechanism 2 for moving items to be printed 3 lying on it in a forward feed direction 4 (from left to right in FIG. 1). Disposed above the conveyor mechanism 2 is a print head arrangement 5 with print heads 6, by means of which the items to be printed 3 moved past from underneath are printed with ink.

The conveyor mechanism 2 is preferably provided in the form of an endless conveyor belt 7, which is guided and driven by means of at least two pulley blocks 8. The top portion of the conveyor belt 7 moved in the forward feed direction 4 is supported on its bottom face by only one or by several guide plates 9. The conveyor belt 7 is pulled in a sliding motion across the horizontally and congruently disposed guide plates 9 resulting in a correspondingly uniform horizontal movement of the items to be printed 3 in the forward feed direction 4.

For each coloured ink, the print head arrangement 5 has a plurality of print heads 6 so that the total width of the printing medium or the items to be printed can be printed in one pass without the print head arrangement 5 having to be moved in the direction transversely to the forward feed direction 4. In other words, the print head arrangement 5 remains stationary in the transverse direction. By means of vertically oriented guides 10, the print head arrangement 5 can be lowered in the direction towards the conveyor belt 7 and moved away from it by raising it.

In order to activate the print heads 6 of the print head arrangement 5, the image data of an image to be printed is converted into control signals for the print heads 6 by means of an image computer 11. In order to control the entire ink jet printing device, a control unit 12 is also provided. The control unit 12 uses software to control the ink jet printing device and the image computer 11 also uses software for processing the image data.

In the embodiment described as an example here, coloured images are printed with cyan, magenta, yellow and karo or black inks and the print heads 6 and print head arrangement 5 is supplied with ink from co-operating tanks 13.

The ink jet printing device 1 may naturally also be equipped for a different number of differently coloured inks.

The ink jet printing device 1 also has a nozzle rinsing device 14, which can be pushed out of a parked position underneath the print head arrangement 5 (indicated by broken lines) once the print head arrangement 5 has been raised. In order to remove any blockages which might occur at the nozzles of the print heads 6, ink is forced through all the nozzles and collected by the nozzle rinsing device 14.

Disposed preferably in the region of the bottom portion of the conveyor belt 7 which is moved in the direction opposite the forward feed direction 4 is a cleaning unit 15 for cleaning the conveyor belt 7. Consequently, any ink residues which might have dropped onto the conveyor belt 7 are removed. The cleaning process effected by the cleaning unit 15 may be based on scraping or sucking off ink residues that have not yet dried. The cleaning action may be additionally assisted by spraying a cleaning fluid onto the conveyor belt, thereby enabling dried ink residues to be removed.

The vertical position of a top face 17 of the items to be printed 3 or the thickness of the items to be printed is detected by a sensor 16, thereby enabling the vertical position of the print head arrangement 5 and the distance of the print head arrangement 5 from the top face 17 of the items to be printed 3 to be automatically adjusted by the control unit 12. Another sensor 18, which is also disposed at the inlet region of the conveyor mechanism 2 upstream of the print head arrangement 5, is provided as a means of detecting a leading edge 19 of items to be printed 3 so that the printing operation of the print head arrangement 5 can be initiated at the correct time.

Also disposed in the inlet region of the conveyor mechanism 2 is a mechanism 20 for correcting the position of the items to be printed 3, by means of which the items to be printed 3 are oriented in a defined position on the conveyor belt 7. Alternatively, it would also be possible to provide a camera 21, by means of which the position and orientation of the item to be printed 3 lying on the conveyor belt 7 can be detected in conjunction with an automatic image recognition system so that this information can be taken into account when the image data is being computed by the image computer 11.

FIG. 2 illustrates the bottom face of the print head arrangement 5 illustrated in FIG. 1, with the print heads 6 disposed in it.

Each of the print heads 6 has a nozzle row 22 made up of a plurality of adjacently lying and linearly oriented nozzles with a nozzle row length 23. The print heads 6 and their nozzle rows 22 are disposed obliquely or at an angle with respect to the forward feed direction 4 so that each of the nozzle rows 22 has a printing range width 24 of the nozzle row 22 as measured perpendicular to the forward feed direction 4 which is significantly shorter than the nozzle row lengths 23. As a result, by using print heads 6 with a low resolution and a low density of nozzles in the nozzle row 22, a significantly higher resolution can be achieved in the direction perpendicular to the forward feed direction 4.

Although this is not intended to constitute a restriction in any way, nine print heads 6 are used respectively in the described example to make up a print head module 25 (for reasons of clarity, only one such print head module 25 is illustrated in FIG. 2). Several such print head modules 25 (four print head modules 25 in the embodiment described here) together form a print head row 26 for printing one of the coloured inks to be printed respectively. This being the case, the print heads 6 are disposed so that the printing range widths 24 of the nozzle rows 22 of two adjacent nozzle rows 22 adjoin one another without any gap so that a total printing range width 27 of the print head row 26 will correspond to the number of print heads 6.

A print head row 26 is provided for each of the coloured inks to be printed. In the embodiment described as an example here, print head rows 26 are disposed one after the other in the forward feed direction 4 and the nozzles of the print head rows 26 therefore extend across a printing range length 28.

In the embodiment described here, piezo inkjet print heads are used by preference for the print heads 6, which means that printing range widths 27 of more than 50 cm can be achieved, thereby enabling resolutions in the range of 200 to 800 dpi to be obtained.

FIG. 3 is a plan view of the nozzle rinsing device 14 illustrated in FIG. 1. The nozzle rinsing device 14 comprises four funnel rows 101 each with four catchment funnels 102. The shape and size of the catchment surface of these catchment funnels 102 is such that all the nozzles of the print heads 6 of a print head module 25 (see FIG. 2) can be covered by a catchment funnel 102 when the nozzle rinsing device 14 is positioned underneath the print head arrangement 5. The distances between the funnel rows 101 in the forward feed direction 4 are dimensioned so that all the print head rows 26 can be positioned above the funnel rows 101 simultaneously (FIG. 1).

The nozzle rinsing device 14 also has another funnel row 103, the catchment funnels 104 of which are likewise dimensioned in terms of their shape and size so that the nozzle rows 22 of a print head module 25 as a whole can be covered when a print head module 25 is positioned above.

Finally, the rinsing device 14 also has a nozzle cleaning unit 105. It preferably comprises a suction bar 106 with suction nozzles 107. The suction bar 6 and the suction nozzles 7 disposed on it are arranged in a straight line and are perpendicular to the forward feed direction 4. The number of suction nozzles 7 corresponds to the number of print heads 6 in a print head row 26. The relative distance between two adjacent suction nozzles is identical to the distance between two adjacent print heads 6 and the same as the printing range width 24 of the nozzle row 22.

The printing operation is interrupted in order to clean the nozzles of the print heads 6 by stopping the conveyor mechanism 2 and the conveyor belt 7 (FIG. 1). The print head arrangement 5 is lifted in the vertical direction along the guides 10 far enough for the nozzle rinsing device 14 to be moved in the horizontal direction, i.e. essentially parallel with the forward feed direction 4, underneath the print head arrangement 5. The nozzle rinsing device 14 is firstly positioned so that a respective funnel row 101 is disposed underneath one of the print head rows 26 and the nozzle orifices of the co-operating nozzle rows 22 (FIG. 2) are covered by the catchment surface of the catchment funnels 102. The print heads 6 are then activated by the control unit 12 so that ink is ejected through all the nozzles. The nozzles of the print heads 6 are rinsed so that any blockages which might have formed can be detached and removed. The ink ejected through the nozzles is collected in the catchment funnels 102 and can be fed back to the respective tank 13 of the corresponding coloured ink after the cleaning process.

To this end, the individual funnel rows are respectively connected to the corresponding tank 13 by means of separate lines 108 via a pump 109 and an ink cleaning unit 110, which may be provided in the form of a filter for example. As the ink ejected during the rinsing process is caught by separate funnel rows 103, the ink may be fed to a recycling system, thereby largely avoiding any loss of valuable ink.

In order to achieve an even better cleaning effect when rinsing the nozzles, a cleaning fluid may be fed through and ejected from the nozzles of the print heads 6. To this end, when activated by the control unit 12 accordingly, a cleaning fluid may be sucked out from a tank 111 and fed through the nozzles of the print head row 26 underneath which the other funnel row 103 of the nozzle rinsing device 14 is positioned. This funnel row 103 is therefore provided as a means of catching and discharging the residual ink and cleaning fluid to a waste tank (not illustrated). This avoids any admixing with the ink discharged through the funnel rows 101 and used again.

Particularly during the rinsing operation whereby ink of the respective colour is fed through the nozzles of the print heads 6 into their co-operating funnel rows 101, it may be that drops of ink remain adhered in the region of the nozzle orifices of the print heads 6. In order to remove these ink drops from the nozzle heads 6, the nozzle cleaning unit 105 is moved alongside and positioned underneath the nozzle rows 22 of the print heads 6 by moving the nozzle rinsing device 14 accordingly. The suction bar 6 with the suction nozzles 7 is displaceably mounted on the nozzle rinsing device 14, thereby permitting a lateral movement of the suction bar 6, i.e. perpendicular to the forward feed direction 4 within the extent of the printing range width 24 of a nozzle row 22. To this end, the suction bar 6 has a driving pin or a driving roller 112, which can be moved into engagement with a guide track (not illustrated) of a respective print head row 26, so that when the nozzle rinsing device 14 is moved parallel with the feed direction 4, the individual suction nozzles 7 of all the nozzles of the obliquely oriented nozzle rows 22 of the print heads 6 are scraped. The suction nozzles 7 are preferably disposed in the vertical direction so that a relative distance from the nozzle rows 22 is only a few tenths of a mm. By applying a negative pressure at the suction nozzles 7, the air flow in the region of the gap between the suction nozzle 7 and the nozzle row 22 draws the remaining ink away and thus removes it.

As an alternative to the nozzle cleaning unit 105, it is also possible to provide a wiper unit with a belt impregnated with cleaning fluid extending round a pulley roller, which is moved along the nozzle rows 22 and pressed against the print heads 6. Such a wiper unit is described, for example, in Austrian patent application A 2099/2003 filed by the same applicant, the contents of which are included in this application by reference.

The cleaning unit formed by the nozzle rinsing device 14 enables cleaning cycles with a duration of only 1 to 2 min to be run. In situations where the ink jet printing device is used as part of a continuous production process, other items to be printed 3 which arrive during the cleaning cycle when the conveyor belt 7 is stopped are diverted to a temporary buffer 113 from which they can be picked up at the end of the cleaning cycle and fed to the conveyor mechanism 2. However, it is also possible to run the cleaning cycle in less than 5 min with the nozzle rinsing device 14. The start-up of this feature is handled on an automated basis by the control unit 12, which activates the temporary buffer 113. In particular, the control unit 11 is able to intervene in the production process of which the ink jet printing device 1 constitutes a part, in which case the control unit 12 is able to reduce or increase the speed of upstream and downstream conveyor belts for the items to be printed 3 if necessary, for example. The control unit 12 may also assume the function of an overall control system for such a production plant.

FIG. 4 is a plan view showing a detail of the ink jet printing device 1 illustrated in FIG. 1 with the mechanism 20 for correcting the position of the items to be printed 3.

The mechanism 20 may be used as a means of orienting items to be printed 3 which have at least two mutually parallel side edges. This is the case if the items to be printed 3 are ceramic tiles 151, for example, which usually have a rectangular shape. The mechanism 20 for correcting the position of the items to be printed 3 has a left-hand and a right-hand guide bar 152, 153, disposed obliquely with respect to the forward feed direction 4 so that a distance 154 between the guide bars 152, 153 gradually reduces in size until it is equal to a width 155 of the items to be printed 3 or tiles 151 at the narrowest point of the guide bars 152, 153. A item to be printed 3 or a tile 151 which is initially placed on the conveyor belt 7 obliquely in the inlet region of the conveyor mechanism 2 comes into contact with one of the guide bars 152, 153 as it is moved forwards by the conveyor belt 7 in the conveying direction 4 and its position is gradually changed so that the side edges of the tile 151 are finally oriented parallel with the forward feed direction 4. The guide bars 152, 153 are mounted at a slight distance above the conveyor belt (FIG. 1) and the distance 154 between and inclination of the guide bars 152, 153 can be adjusted by means of two positioning carriages 156, 157 on which they are displaceably mounted.

The operating mode of the ink jet printing device 1 described above will now be explained in more detail. It is assumed that the items to be printed 3 are tiles 151. The operating mode will be described with reference to FIGS. 5 and 6. In view of the fact that it can be used as part of a continuous manufacturing process or a continuous production line, a device or a system of the type described here may also be termed a Synchronized Inline Printing System (SIPS), or Durst SIPS-Synchronized Inline Printing System.

Opting for an arrangement incorporating a lot of relatively low resolution print heads 6 in the manner described with reference to FIG. 2 to make up a print head arrangement 5 results in a split overall print head of a large surface area with a relatively high resolution. As described in connection with FIG. 2, the print head arrangement 5 is split into four print head rows 26 for the four colours used. As a result, if the tiles 151 are relatively short, several tiles 151 may be disposed underneath the print head arrangement 5 simultaneously. Moreover, however, even a print head row 26 is so big relative to the smallest tiles 151 that two tiles 151 may be disposed simultaneously underneath a print head row 26, in which case two partial images belonging to different tiles 151 may be printed simultaneously by means of this print head row 26. The control unit 12 of the ink jet printing device 1 is therefore configured so that it is able to print different colour separations of several tiles 151 simultaneously and print two different tiles 151 or two images for one colour separation simultaneously.

Based on a first example of an embodiment of the control or operating mode of the ink jet printing device 1, an image data transmission is provided between the image computer 11 and the print heads 6 with limited colour channels. Accordingly, a total image or the complete image data is prepared in the image computer 11 so that all of the image data is sent across a transmission run with a high bit rate in the form of packets. Accordingly, the individual colour channels are disposed byte-wise adjacent to one another in a recurring sequence. A transmission route 201 therefore exists between the image computer 11 and the print head arrangement 5 (se FIG. 1 and FIG. 5). Since little is required in the way of hardware components, this variant has the advantage of not being very susceptible to faults. Another advantage is the fact that simpler transmission protocols may be used for the data transmission between the image computer 11 and the print head arrangement 5 and the fact that this approach is easier for the control unit 12 to control.

FIG. 5 is a block diagram illustrating the flow of data between the image computer 11 and the print head arrangement 5. In order to retain better clarity, only one of the four print head rows 26 is illustrated and one image data circuit of the print head arrangement.

The images or image data for the individual tiles 151 are retrieved by the control unit 12 controlling the printing sequence and transmitted from the image computer 11 across the transmission route 201. The transmission route 201 is preferably provided in the form of a fibre-optic data transmission cable. An image is made up of four colour separations, the bytes of which cross within one another. The corresponding image information data packets are split into four colour separations in a data transmission circuit 202 and temporarily stored in buffer circuits 203. As this happens, the individual colour separations are written to separate memory banks 204 (FIG. 6) of the buffer circuit 203 on the basis of images. FIG. 6 is a block diagram illustrating an example of one of the buffer circuits 203 illustrated in FIG. 5. As illustrated in FIG. 6, up to seven images (for seven tiles) can be temporarily stored in the buffer circuits 203 and output one after the other. The memory banks 204 therefore operate as a dynamic ring buffer, which outputs the recorded images when prompted by an appropriate input signal or start signal.

The buffer circuit 203 also fulfils other functions. Via the buffer circuit 203, the data flow between incoming print data and data output to the print head is controlled. It also releases the data flow from the image computer 11. The buffer circuit 203 also ensures that in the memory banks 204 (FIG. 6) so-called zero information is inserted in the stored data for situations in which no ink is to be ejected through the nozzles of the print heads 6. "Zeros" or "zero information" is necessary for gaps between two consecutive tiles 151 on the one hand and for those periods during which a tile 151 is not disposed completely underneath the print heads 6 of a print head row 26 on the other hand, and because of the oblique position of the print heads 6, only the nozzles disposed above a top face 17 of a tile 151 eject ink.

The buffer circuit 203 also manages the print scenarios whereby either only one tile 151 is ever disposed underneath a print head row 26 or alternatively two tiles 151 may be simultaneously disposed under a print head row 26 for certain periods.

In terms of the way in which images for printing tiles 151 are temporarily stored in the buffer circuit 203, there are two different scenarios. In the first situation, the print run for printing several tiles 151 relates only to tiles 151 of the same size or the same length. In the case of the second scenario, tiles 151 of differing length are printed.

A description will now be given of the scenario based on a print run with tiles 151 which are always of the same tile length. In this case, the image computer 11 tells the control unit 12 controlling the printing process what the tile length is and the corresponding number of data packets per tile 151. At the start of the print run, seven images are firstly loaded into the memory banks 204 of the buffer circuits 203. These images are requested from the image computer 11 by the control unit via the transmission route 201 and the data transmission circuit 202 and forwarded to the buffer circuits 203 of the individual colour extracts. Provided no tile is being conveyed on the conveyor belt 7 from the inlet region of the conveyor mechanism 2 towards the print head arrangement 5, the system is initially in a stand-by phase. As soon as a first tile 151 passes the start sensor or the sensor 18, a counting unit 205 starts up a counter, which finally initiates the printing operation by the individual print head rows 26 or colour channels. When the first counter of the counting unit 205 reaches a counter status for the first detected tile 151 corresponding to the equivalent of the distance from the point at which the sensor 18 is mounted to the first print head row 26 (in FIG. 1 the print head row 26 for C=cyan), the output of this colour separation and the corresponding data from the buffer circuit 203 is initiated for the colour cyan. This routine takes place in the same way for the other three colours. The image data is distributed to the print heads 6 of the print head modules 25 of the corresponding print head row 26 by means of a print head interface 206.

The shorter the arriving tiles 151 are, the more frequently a counter of the counting unit 205 will be started by the sensor 18, before the full output of an image has even been terminated. Since, in the case of the shortest tiles 151, a total of six tiles may be disposed under the print head arrangement simultaneously, the counting unit 205 has seven counters, which are respectively started one after the other for one of the tiles 151 detected by the sensor 18. When the individual counters of the counting unit 205 reach a counter status at which the individual colours are output, the output of data from the memory banks 204 of the buffer circuits 203 is initiated by them.

Once the counters of the counting unit 205 reach a maximum counter status, they are re-set and remain in this state until a start-up is initiated by the sensor 18 again. With this way of controlling the ink jet printing device 1, the tiles 151 may arrive at the print head arrangement 5 at different relative distances from one another.

Due to the oblique position of the print heads 6 with respect to the forward feed direction 4 (FIG. 2), a correspondingly complex organisation of the output of data from the memory banks 204 of the buffer circuits 203 is necessary. Apart from taking account of the disposition of the print heads 6 within a print head row 26, the image data must be re-sorted by the image computer 11. This being the case, only useful data is sent by the image computer 11, i.e. for those nozzles of the print heads 6 and for those image pixels at which ink can actually be ejected. The advantage of this is that maximum use can be made of the capacity of the transmission route 201.

Firstly, a description will be given of how the print head arrangement 5 is activated in the situation where there is a maximum of one tile 151 underneath a print head row 26. In this situation, the distance of the tiles 151 from one another as they arrive is big enough for there to be no circumstances under which two tiles 151 can be disposed underneath a print head row 26 at the same time.

Whenever inks are being ejected by a print head 6, the information must firstly be available for all the nozzles within a nozzle row 22 as to whether ink is to be ejected through this nozzle ("one") or whether there must be no ink ejection ("zero"). Due to the oblique disposition of the print heads 6 within a print head row 26, it is necessary for the individual print heads 6 to be initially loaded with useful information on a successive basis only for each process of initiating an ink ejection as a tile 151 moves underneath a print head row 26. For those nozzles of a nozzle row 22 which are not disposed above the top face 17 of the tile 151, this information will be "zero". As the tile 151 moves farther underneath the print head row 26, the number of "zeros" decreases and the amount of image information relating to printing increases. The buffer circuits 203 autarchically recognise that they must initially output "zeros" with every loading cycle of a print head 6 and then output useful information from the memory bank 204 about what is to be printed instantaneously, until the tile 151 has moved fully underneath a print head row 26. As this happens, the number of "zeros" decreases and the number of useful bits increases until there are now only useful bits being loaded into the print heads. As the tile 151 moves away from a print head row 26, the same routine is run in the reverse sequence.

In the following description of how the print head arrangement 5 is activated, it is assumed that it is also possible for two tiles 151 to be disposed underneath a print head row 26 on a phased basis. In this situation, the distance of the tiles from one another as they arrive is small enough so that it is also possible for two tiles 151 to be moved forward simultaneously underneath a print head row 26. This being the case, the information made available to a print head 6 also contains information about a first image to be printed on the first tile 151 and information about a second image for the second tile 151. As the first tile 151 then starts to move away from the print head row 2, the buffer circuit 203 inserts the above-mentioned zero bits after the useful information, the number of which increases from one triggering operation to the next triggering operation. As the next tile 151 starts to move underneath the print head row 26 even before the first tile 151 has moved away from the print head row 26, the buffer circuit 203 loads the print heads 6 in readiness for a triggering operation for ejecting ink successively with the following:

data from the memory bank 204 $n$ for the tile 151 moving away from the print head row 26 and the colour separation of which currently being processed has been almost completely printed;

zero bits to take account of the distances between the tiles 151;

data bank from the memory bank 204 $n+1$ for the second tile 151 now moving underneath the print head row 26.

In this case, image data relating to two images is simultaneously read from two different memory banks 204 (n and n+1) of the buffer circuit 203 and printing takes place from the print heads 6 of the relevant print head row 26.

The buffer circuit 203 also makes allowance for the fact that, of the selected resolution, a different number of zero bits must be inserted as the tiles 151 approach or between two consecutive tiles 151 (with a short tile distance). Printing is able to take place in resolution stages of 100, 200, 300, 400, 500, 600 and 800 DPI.

The operating mode described above applies to all four of the colours but may also be used for a different number of coloured inks. This being the case, the number of print head rows 26 and the number of buffer circuits 203 must be changed accordingly.

The printing process for printing an image onto a tile 151 is therefore run as follows for the individual coloured inks. When the counter of the counting unit 205 for the relevant tile 151 reaches the counter status for "print cyan", the printing operation for cyan is started. When the counter of the counting unit 205 reaches the counter status "print magenta", the printing operation for magenta is started, and so on. The threshold counter statuses for outputting the relevant colours are sent by the image computer 11 to the electronic system of the print head arrangement 5, where they are stored.

A description will now be given of the scenario based on a print run for tiles 151 which each have a different tile length. In such a situation, the system needs two sensors by means of which the tiles 151 can be detected. The first sensor 16 disposed in the inlet region of the conveyor mechanism 2 detects the tiles 151 and measures their length. Depending on the measured length, the control unit 12 controlling the printing sequence sends the number of data packets matching the measured tile 151 from the image computer 11. The image computer 11 computes a size matching an image and sends it to the data transmission circuit 202. When the tile 151 arrives at the second sensor 18, which operates as a so-called start sensor, a counter of the counting unit 205 is started. Printing of a colour separation by the co-operating print head row 26 starts when the threshold counter status for the corresponding colour and print head row 26 is reached, in the manner described above.

In the case of a second embodiment of the operating mode of the ink jet printing device 1, an image data transmission takes place between the image computer 11 and the print heads 6 with separate or split colour channels. Accordingly, four different colour separations are held in the image computer 11 and can be made available as and when necessary by the control unit 12 controlling the image data processing system. Again, there are two possible variants, namely the use of a single transmission route 201 between the image computer 11 and the print head arrangement 5 on the one hand or the use of four parallel transmission routes 201 for each of the colour separations on the other hand.

If using a single transmission route 201, the individual colour separations are requested by the control unit 12 as soon as the tile 151 is disposed underneath the relevant print head row 26. This being the case, the data for the individual colour separations of several tiles 151 is temporarily stored in the image computer 11 and must be clearly allocated. The last colour separation of the first tile 151 is not requested until the first colour separation of the sixth tile 151 has already been printed, for example. The advantage of this variant is that a smaller number of memory banks 204 is needed for the ring buffer available for each colour and the data for the individual colours is requested only when it is going to be printed.

In the variant based on four parallel transmission routes 201, co-operating interface cards must be provided in the image computer 11 for every colour separation. The system of this variant operates with physically separate channels for the individual colour separations.

The ink jet printing device 1 is preferably provided with images and patterns for printing ceramic tiles 151. If free edges were left when printing the tiles 151, it would spoil the visual appearance and when the image data for activating the print head arrangement 5 is generated by the image computer, therefore, the relevant image detail is selected so that printing goes at least slightly beyond the edges of the tiles 151. When the image data is being computed by the image computer 11, however, allowance may also be made for fading the tiles 151 used in the form of blanks when determining the size of the image detail to be printed.

However, the image computer 11 also makes it possible to work with an image covering the surface of many tiles 151 and the part-details can be printed onto a corresponding number of tiles 151. Once the individual tiles 151 have been appropriately grouped, each with a part-detail, very large overall images can be easily produced. In particular, this is possible without having to produce complex print masters.

Another example of the versatile applications which are possible is that of creating tiles 151 with as different patterns as possible. This is achieved due to the fact that a randomly selected image detail is defined by the image computer 11 from an image master, which might be based on the grain of a stone structure or a broken surface of a stone, and used as a basis for creating the printed image on the tile 151. However, each of these image details randomly selected by the image computer 11 is used for printing only a single tile 151 so that each of the tiles 151 has an individual appearance and when assembled, the overall image which is obtained does not contain a recurring pattern. The pattern of the stone structure that is thus produced gives a very natural impression overall.

The image computer 11 also makes it possible to work with a surface structure other than a flat top face 17 which may incorporate recesses, for example. The surface structure of the top face 17 may be taken into account by the image computer 11 in such a way that a selected pattern is printed only in the area where there are recesses in the tile 151, for example.

In order to transmit data from the image computer 11 to the print head arrangement 5, it is possible in particular to transmit via the transmission route 201 at between 30 MB/s and 70 MB/s, preferably 50 MB/s. It has proved to be of particular advantage to transmit data from the image computer 11 across the transmission route 201 at a transmission rate of 50 or more than 50 MB/s (megabyte/second). When the ink jet printing device 1 is operating, therefore, the items to be printed 3 can be fed by the conveyor mechanism 3 at a speed of up to 70 m/min (meter/minute). In particular, the movement of the items to be printed may take place at a variable speed of up to 70 m/min.

As described above, the mechanism 20 for correcting the position of the items to be printed 3 is provided when printing rectangular tiles 151, thereby enabling the tiles 151 to be moved into a defined position. However, the ink jet printing device 1 also permits the printing of items to be printed 3 which have any other external contour or shape as well as orientation. To this end, the camera 21 in the inlet region of the conveyor mechanism 2 records an image of the item to be printed 3 lying on the conveyor belt 7. This image is transmitted from the camera 21 to the control unit 12 and the contour of the item to be printed 3 is determined with the aid of automatic image recognition software. The contour of the item to be printed 3 is then transmitted to the image computer 11. It takes account of the shape and orientation of the item to be printed by transforming the pattern or the corresponding image data so that it, i.e. the position and orientation, are correctly matched.

In order to increase the performance of the ink jet printing device 1, other computers of a network for computing image data for print runs may be connected to the image computer 11. This being the case, it is of particular advantage if the control unit 12, which may itself be linked by a computer, and the image computer 11 are integrated in a client-server architecture of a computer network and other client computers are available in the computer network for computing image data in addition to the image computer 11. As a result, when a print run is operating, print jobs for a subsequent job can be processed and computed by the additional client computers.

Various operating modes for printing tiles 151 with the ink jet printing device 1 will be described in more detail with reference to FIGS. 7 to 13 below.

With the ink jet printing device 1 proposed by the invention, it is possible that, whilst printing on-the-fly, different details from a larger image file can be automatically printed on the basis of an ordered sequence or using a random principle (various operating modes are possible in both cases) so that every printed master (e.g. a tile) has a different pattern where possible and thus best imitates nature. By "on-the fly" is meant that the image data for an image file to be printed may be processed so that even while a first part of the image is being printed by the print heads 6 of the print head arrangement 5, the image data for activating the print head arrangement for another part of the image or the image data is already being processed. In this sense, the image is therefore processed in real time.

FIG. 7 is a simplified symbolic diagram showing how a row of tiles 151 with a decorative pattern is produced. To this end, an image detail 252 is selected by the user from an image master 251 with the aid of the software of the image data processing system of the image computer 11 (FIG. 1). The image master 251 might be the digital image of a broken surface of a stone or a stone contour, for example. The size of this image master 251 corresponds to a real size of an approximately 1 m×2 m side length and thus enables an appropriate image detail 252 to be selected which corresponds to the size of one of the tiles 151. In the simplest approach, the same image detail 252 is applied to a previously selected number of tiles 151 by the ink jet printing device 1. The row of tiles 151 illustrated in FIG. 7 is in the ready printed state, leaving the ink jet printing device 1. Each of the tiles 151 is printed with the same image detail 252—symbolised by the letter A.

FIG. 8 illustrates the printing of a row of tiles 151 with an ordered selection of image details 252 from the image master 251. In the embodiment illustrated as an example here, twelve adjacently lying image details 252—symbolised by the FIGS. "1" to "12"—are selected from the image master 251. Twelve respective tiles 151 can therefore be individually printed with a different image detail 252, thereby resulting in a corresponding plurality of differently designed tiles 151.

FIG. 9 illustrates another example, based on individual different image details 252 selected from an image master 251 for printing or decorating tiles 151. In this case, a first image detail 252 is selected from the image master 251 first of all. In addition, a distance 253 and a distance 254 in the X and Y direction are selected. A second image detail 255 is then obtained by shifting the boundaries of the first image detail 252 in the X and Y directions by the corresponding distance 253 in the X direction and the distance 254 in the Y direction. By shifting the boundaries of the image detail 255 again by the distances 253, 254 in the X respectively Y direction, a third image detail 256 and a fourth image detail 257 are then obtained. This routine of selecting image details 252 can be continued at least until the boundaries of the image master 251 are reached. The quantity of all these image details 251, 255, 256 etc., is then held ready by the image computer 11 and is available for printing a corresponding number of tiles 151.

FIGS. 10, 11 and 12 are examples showing the random selection of image details 252 from an image master 251.

In the case of the method illustrated in FIG. 10, a first image detail 252 is selected first of all, after which am appropriate pair of values is determined for the distances 253, 254, depending on which the second image detail 255 will then be defined. Other image details 256, 257, etc., are then determined with other random pairs of values for the distances 253, 254 for the offset in the X and Y direction.

In the process of selecting image details 252 illustrated in FIG. 11, in addition to a random selection of the distances 253 and 254, there is also a random rotation of the boundary lines of the second image detail 255 and the following image details 256, 257, etc., by 90°.

In the selection process symbolically illustrated in FIG. 12, in order to select the other image details 255, 256, 257, etc., from a first image detail, there is an offset by randomly selected distances 253, 254 in the X and Y direction and an appropriately selected rotation by a random angle in the XY plane.

The process of selecting image details 252 illustrated in FIGS. 8 to 12 therefore enable tiles 151 with different patterns to be produced so that each of them has the most individual possible appearance, thereby creating a natural impression.

In the case of an additional option of the operating mode for the ink jet printing device, the control unit 12 or the image computer 11 may allocate a value of a percentage-based frequency ($h_A$, $h_B$, etc.) to the individual image details 252, 255, 256 etc., from the sequence of the image details 252 (FIG. 8 to 12). As a result, if producing a large number of tiles 151, they can be printed with the image detail 252 "A" at a frequency of $h_A$ and others can be printed with an image detail 255 "B" at a percentage-based frequency of $h_B$ within the overall quantity of printed tiles 151 produced (FIG. 12).

FIG. 13 illustrates another variation in the operating mode of the ink jet printing device 1 for producing tiles 151 with as different as possible decorative patterns. In addition to a sequence of image details 252, 254, 255, etc., from a first image master 251 (A, B, C, D, etc.), the image computer 11 or another client computer of a computer network connected to the image computer 11 and the control unit 12 computes another sequence of image details 259, 260, 261, 262, etc. (O, P, Q, R, etc.) from a second image master 258. A first print run or print job is then run with the image details 252, 255, 256, etc., (A, B, C, D) of the first image master 251 and a second print run or print job is run with the image details 259, 260, 261 etc. (O, P, Q, R, etc.) by the image computer 11 and held in readiness for printing tiles 151. Another option is to mix image details 252, 255, etc., from the first print run randomly with the image details 259, 260, etc. of the second print run. During ongoing printing by the ink jet printing device 1, the data from image details from the different image masters 251, 258 is selected at random and used to print the tiles 151.

It is also possible to use the ink jet printing device 1 to print tiles 151 with an exactly fitting relief-type surface structure with an image detail corresponding to this surface structure. To this end, the item to be printed 3 or the tile 151 is identified by a camera 21 disposed in the inlet region of the conveyor mechanism 2 of the ink jet printing device 1 (FIG. 1). Alternatively, the tile 151 may be identified by means of a marking with a code applied to the bottom face of the tile 151, in which case this code is identified by an appropriate sensor (not illustrated). The control unit 12 then prompts the image computer 11 to make the image corresponding to the tile 151 or its surface structure available. Detecting the nature of the tile 151 as well as it orientation by means of the camera 21 means that it is then possible to ensure that parts of the relevant image corresponding to a raised area are printed at the corresponding raised point of the tile 151 and parts of the image corresponding to a recess are printed accordingly at a recessed point of the tile 151. Providing a code on the items to be printed 3 or the tile 151 and detecting and identifying it with the camera 21 means that it is possible to process different tiles 151 with different surface structures in a single print run. Depending on the nature of the tiles 151 detected or recognised by the camera 20, the control unit 12 or the image computer 11 can hold the corresponding image in readiness for printing and the print heads of the print head arrangement 5 are activated by the corresponding control signals.

The embodiments illustrated as examples represent possible design variants of the ink jet printing device and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the ink jet printing device, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1; 2; 3; 4; 5, 6; 7, 8, 9; 10, 11, 12 and 13 constitute independent solutions proposed by the invention in their own right. The objectives and associated solutions proposed by the invention may be found in the detailed descriptions of these drawings.

LIST OF REFERENCE NUMBERS

1 Ink jet printing device
2 Conveyor mechanism
3 Item to be printed
4 Forward feed direction
5 Print head arrangement
6 Print head
7 Conveyor belt
8 Pulley roller
9 Guide plate
10 Guide
11 Image computer
12 Control unit
13 Tank
14 Nozzle rinsing device
15 Cleaning unit
16 Sensor
17 Top face
18 Sensor
19 Leading edge
20 Mechanism
21 Camera
22 Nozzle row
23 Nozzle row length
24 Printing range width
25 Print head module
26 Print head row
27 Printing range width
28 Printing range length
101 Funnel row
102 Catchment funnel
103 Funnel row
104 Catchment funnel
105 Nozzle cleaning unit
106 Suction bar
107 Suction nozzle
108 Line 109 Pump
110 Ink cleaning unit
111 Tank
112 Driving roller
113 Temporary buffer
151 Tile
152 Guide bar
153 Guide bar
154 Distance
155 Width
156 Positioning carriage
157 Positioning carriage
201 Transmission route
202 Data transmission circuit
203 Buffer circuit
204 Memory bank
205 Counting unit
206 Print head interface
251 Image master
252 Image detail
253 Distance
254 Distance
255 Image detail
256 Image detail
257 Image detail
258 Image master
259 Image detail
260 Image detail
261 Image detail
262 Image detail

The invention claimed is:

1. Ink jet printing device (1) for printing multicoloured images with an essentially horizontally disposed conveyor mechanism (2) for moving items to be printed (3) lying on it in a forward feed direction (4), and with a print head arrangement (5) disposed above the conveyor mechanism (2) which is disposed stationary relative to the conveyor mechanism (2) during the printing process, and the print head arrangement (5) comprises several print heads (6) each with several nozzles disposed in a nozzle row (26), and the nozzle rows (22) have a printing range width (24) as measured perpendicular to the forward feed direction (4) by means of which a total printing range width (27) of the print head arrangement (5) is formed corresponding to the number of print heads (6), and the print head arrangement (5) is disposed so that it can be moved vertically on a guide (10) and a nozzle rinsing device (14) which can be positioned underneath the print head arrangement (5) as and when necessary is provided, wherein the nozzle rinsing device (14) has a funnel row (101) for every print head row (26) and the funnel rows (101) are each connected via a separate line (108) to a tank (13) corresponding to the respective colour for supplying the print heads (6), and an ink cleaning device (110) is respectively provided between the funnel rows (101) and the tanks (13), and the nozzle rinsing device (14) has another funnel row (103), which other funnel row (103) is connected to a waste tank.

2. Ink jet printing device (1) as claimed in claim 1, wherein the funnel row (101, 103) has at least one catchment funnel (102, 104) for each of the colours to be printed and the catchment funnel (102, 104) has a catchment surface which covers all the nozzles of a print head (6).

3. Ink jet printing device (1) as claimed in claim 1, wherein a print head row (26) extending perpendicular to the forward feed direction (4) is provided for each of the colours to be printed, and the print head rows (26) are formed by adjacently disposed print heads (6), and the print head rows (26) are disposed one after the other in the forward feed direction (4).

4. Ink jet printing device (1) as claimed in claim 3, wherein several print heads (6) of each one of the print head rows (26) constitutes a print head module (25) and the print head rows (26) are each made up of several print head modules (25).

5. Ink jet printing device (1) as claimed in claim 1, wherein the nozzle rows (22) are disposed obliquely with respect to the forward feed direction (4).

6. Ink jet printing device (1) as claimed in claim 1, wherein the distances of the funnel rows (101) with respect to the forward feed direction (4) are dimensioned so that all of the print head rows (26) can be positioned above a funnel row (101) simultaneously.

7. Ink jet printing device (1) as claimed in claim 1, wherein the nozzle rinsing device (14) has a nozzle cleaning unit (105).

8. Ink jet printing device (1) as claimed in claim 7, wherein the nozzle cleaning unit (105) is provided with suction nozzles (107) which can be positioned underneath the nozzles of the print heads (6).

9. Ink jet printing device (1) as claimed in claim 8, wherein the suction nozzles (107) are disposed on a suction bar (106) and the suction nozzles (107) are disposed in a straight line oriented perpendicular to the forward feed direction (4), and two mutually adjacent suction nozzles (107) are disposed at a distance that is equal to the distance between two adjacent print heads (6) of a print head row (26).

10. Ink jet printing device (1) as claimed in claim 9, wherein the suction bar (6) is disposed on the nozzle rinsing device (14) so that it can be displaced in a direction perpendicular to the forward feed direction (4) at least to the extent of the distance between two adjacent print heads (6).

11. Ink jet printing device (1) as claimed in claim 9, wherein the suction bar (6) is provided with a driving pin or with a driving roller (112) which engages in a guide track of the print head rows (26), and the guide tracks are oriented parallel with the nozzle rows (22).

12. Ink jet printing device (1) as claimed in claim 7, wherein the nozzle cleaning unit (105) is provided in the form of a wiper unit, comprising a belt impregnated with a cleaning fluid which circulates round a pulley roller.

13. Ink jet printing device (1) as claimed in claim 1, wherein the conveyor mechanism (2) is provided in the form of a conveyor belt (7).

14. Ink jet printing device (1) as claimed in claim 13, wherein the conveyor mechanism (2) has a guide plate (9) by means of which a moved top portion of the conveyor belt (7) is guided in the forward feed direction (4).

15. Ink jet printing device (1) as claimed in claim 13, wherein a cleaning unit (15) is provided for cleaning the conveyor belt (7).

16. Ink jet printing device (1) as claimed in claim 1, wherein a temporary buffer (113) is disposed upstream of the conveyor mechanism (2), which temporary buffer (113) is designed to accommodate items to be printed (3) during a period in which the conveyor belt (7) is stopped.

* * * * *